US005797602A

United States Patent [19]
Less

[11] Patent Number: 5,797,602
[45] Date of Patent: Aug. 25, 1998

[54] MECHANICAL SEAL FOR WATER PUMP OF HEAVY DUTY VEHICLE

[75] Inventor: Steven C. Less, Orland Park, Ill.

[73] Assignee: Pac-Seal Inc. International, Burr Ridge, Ill.

[21] Appl. No.: 728,998

[22] Filed: Oct. 10, 1996

[51] Int. Cl.⁶ .................................................. F16J 15/34
[52] U.S. Cl. .................................................. 277/372
[58] Field of Search ................................ 277/39, 40, 42, 277/43, 88, 92, 136, 137, 182, 183, 184

[56] References Cited

U.S. PATENT DOCUMENTS

| | | | |
|---|---|---|---|
| 2,598,886 | 6/1952 | Brummer | 277/42 |
| 2,717,790 | 9/1955 | Chambers, Jr. et al. | 277/42 |
| 3,536,333 | 10/1970 | Gits et al. | 277/40 |
| 3,764,148 | 10/1973 | Mullaney | 277/40 |
| 4,063,741 | 12/1977 | Kerr | 277/88 |
| 4,415,167 | 11/1983 | Gits | 277/43 |
| 4,451,049 | 5/1984 | Charhut | 277/88 |
| 5,123,660 | 6/1992 | Dahlheimer et al. | 277/136 |

*Primary Examiner*—Scott Cummings
*Attorney, Agent, or Firm*—Flynn, Thiel, Boutell & Tanis, P.C.

[57] ABSTRACT

A mechanical seal assembly for use in a coolant circulation system of a heavy diesel engine. The seal assembly includes relatively rotatable seal rings disposed in surrounding relationship to the pump drive shaft. One seal ring is non-rotatable with respect to the drive shaft and the other is non-rotatable with respect to the surrounding housing. These seal rings have opposed annular seal faces maintained in relatively rotatable contacting relationship due to the urging of a spring which acts against the non-rotating seal ring, the latter in turn being axially movably supported on a lightweight compact mounting member which stationarily seats within the stuffing box. The mounting member has a sleeve part which externally surrounds a radially projecting flange provided on the non-rotatable seal ring, which sleeve part has a large opening provided with a plurality of circumferentially elongate flats defined circumferentially therearound, preferably a hexagonal wall defining the opening, and the flange of the seal ring similarly has a mating contour, such as a hexagonal contour, so that the non-rotating seal ring is axially slidably supported within the sleeve part of the mounting member but at the same time a large and durable non-rotatable contact region is defined between the non-rotating sealing ring and the mounting member to provide a compact and durable structure possessing long life.

8 Claims, 5 Drawing Sheets

MECHANICAL SEAL FOR WATER PUMP OF HEAVY DUTY VEHICLE

FIELD OF THE INVENTION

This invention relates to a mechanical seal for use with a water pump of a heavy duty engine, such as a diesel engine for a truck, a vessel or a power plant and in particular to a compact and low cost mechanical seal having significantly improved durability and life.

BACKGROUND OF THE INVENTION

Mechanical seals of the contacting face type are widely used in many different industries, and are provided in a wide range of sizes, with such seals varying from very small low cost assemblies to very large expensive assemblies. One application for a compact and inexpensive mechanical seal is for sealing the rotary pump associated with the coolant circulation system of a diesel engine, particularly heavy duty vehicles such as trucks. In the coolant circulation system for a diesel engine, it is a conventional practice to use a compact and relatively inexpensive mechanical seal to effect sealing between the pump casing and the rotating drive shaft for the pump impeller. Such conventional arrangement is diagrammatically illustrated in FIG. 1, wherein there is shown a coolant circulation system 10 for a diesel engine having a pump 11 provided with inlet and outlet passages 12 and 13, respectively, for supplying and discharging liquid coolant to and from the interior of the pump casing 14. The pump has a conventional pumping rotor 15, such as an impeller, secured to a drive shaft 16 which rotates about its longitudinal axis 17. The drive shaft 16, which is driven from the diesel engine, projects outwardly through a sleeve or housing part 21, which part defines therein a chamber (often referred to as a "stuffing box") in surrounding relationship to the shaft 16. This stuffing box in turn accommodates therein a conventional contacting face type mechanical seal assembly as diagrammatically indicated at 22. This seal assembly 22 provides a sealed relationship between the fluid chamber 18 and the surrounding atmosphere 19.

Figure 1:
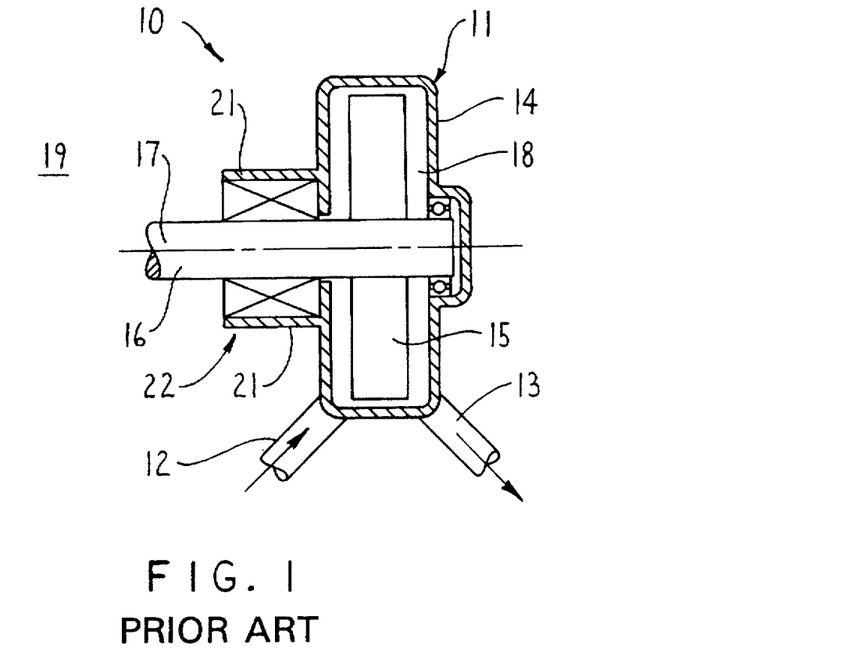
FIG. 1 is a diagrammatic illustration showing a conventional coolant pump arrangement associated with a coolant circulation system of a heavy duty vehicle engine, such as a truck engine.
Figure 2:
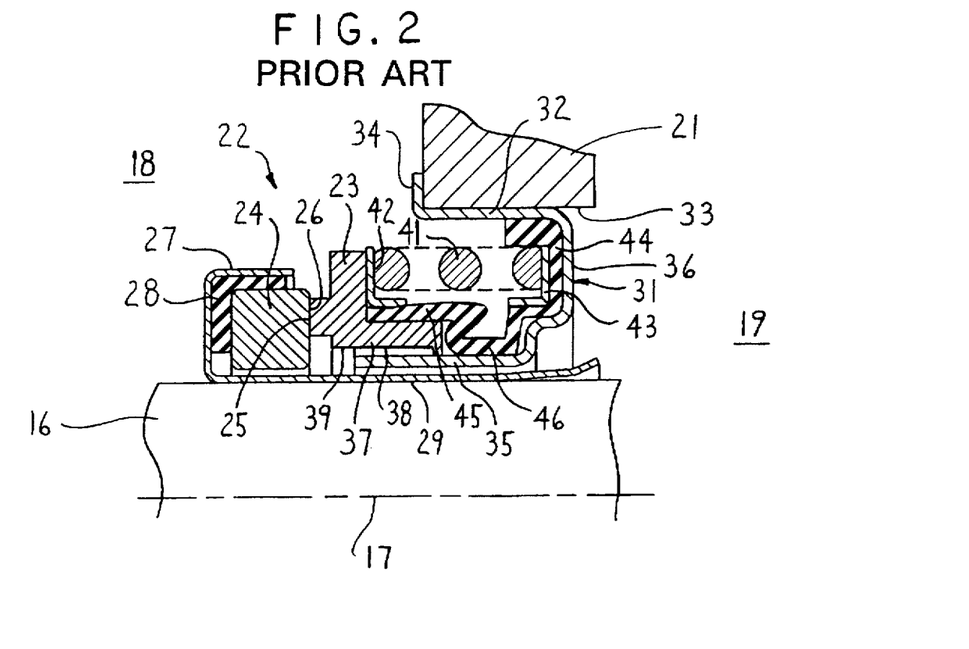
FIG. 2 is a central cross-sectional view showing one-half of a mechanical seal assembly of the type utilized in the system of FIG. 1.
Figure 2A:
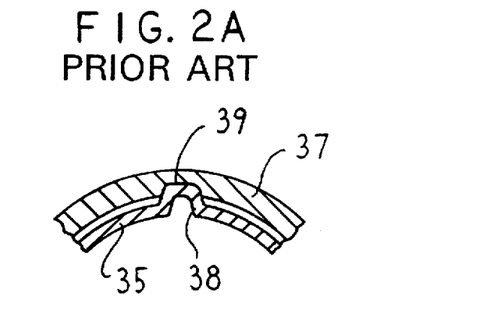
FIG. 2A is an enlarged fragmentary sectional view showing the drive connection with the stationary seal ring.

One example of a known mechanical seal as used in the arrangement of FIG. 1 is illustrated by FIGS. 2 and 2A. This known mechanical seal 22 includes axially opposed seal rings 23 and 24 which are disposed generally in surrounding relationship to the shaft 16, and respectively have opposed annular seal faces 25 and 26 formed on opposed axial ends thereof. These seal faces are normally maintained in relatively rotatable but axial contacting engagement to maintain a sealed relationship between the fluid chamber 18 and the surrounding environment 19. The seal ring 24 is the rotating ring, often referred to as a rotor, and it is non-rotatably secured within an annular elastomeric support ring 28, the latter in turn being secured within a surrounding annular sleeve part 27. This sleeve part 27 is fixedly, here integrally, joined to an elongate shaft sleeve 29 which extends axially throughout the length of the mechanical seal assembly and is non-rotatably secured to the shaft 16 in surrounding relationship therewith. As to the other seal ring 23, this is a non-rotating ring and is sometimes referred to as a stator. This non-rotating seal ring 23 is non-rotatably but axially supported on the surrounding housing 21 through an annular mounting member 31 which surrounds the shaft 16 and, when viewed in a radial cross-section extending from the axis of the shaft, has a generally axially-extending U-shaped cross-section. This mounting member 31 includes an outer sleeve or annulus 32 which is non-rotatably positioned within the stuffing box opening 33 of the housing 21, and at its outer free end is provided with a radially outwardly directed flange 34 which abuts the front face of the housing 21. The mounting member 31 also has an inner annulus or sleeve 35 which is joined to the outer annulus 32 through an intermediate radial wall 36. The inner sleeve 35 exteriorly surrounds the shaft sleeve 29, and is normally slightly spaced therefrom. This inner sleeve 35 in turn non-rotatably but axially slidably supports the non-rotating seal ring 23 thereon. For this purpose, the non-rotating seal ring 23 has an axially projecting sleeve part 37 which exteriorly surrounds the inner sleeve 35, and this inner sleeve 35 in turn typically has two or more axially elongate ribs 38 which project radially outwardly through a small extent. The ribs 38 project into axially elongate shallow grooves 39 formed in the inner peripheral wall of the sleeve part 37 to thereby non-rotatably but axially slidably support the seal ring 23 on the inner sleeve 35. A compression spring 41 is positioned generally radially between the outer sleeve 32 and the inner sleeve 35, with opposite ends of the spring being engaged with appropriate washers or ferrules 42 and 43. The one ferrule 42 directly abuts a rear face of the seal ring 23, whereas the other ferrule 43 is sealingly engaged against a radially projecting elastomeric wall 44 which in turn seats against the radial housing wall 36. This elastomeric wall 44 is part of an elastomeric flexible diaphragm or bellows 45, the latter including a flexible elongate sleeve part 46 which is disposed radially inwardly of the spring but radially outwardly of the sleeve 35, with the free end of this elastomeric sleeve part 46 being stationarily and sealingly clamped in surrounding relationship to the rear sleeve part 37 of the face ring 23. With this arrangement, seal ring 24 rotates with the shaft 16, and spring 41 urges the non-rotating face ring 23 toward the rotating face ring 24 to thereby maintain a relatively rotatable annular contact between the opposed faces 25 and 26 so as to at least greatly minimize any loss or leakage of fluid from the chamber 18 to the surrounding environment 19.

Figure 3:
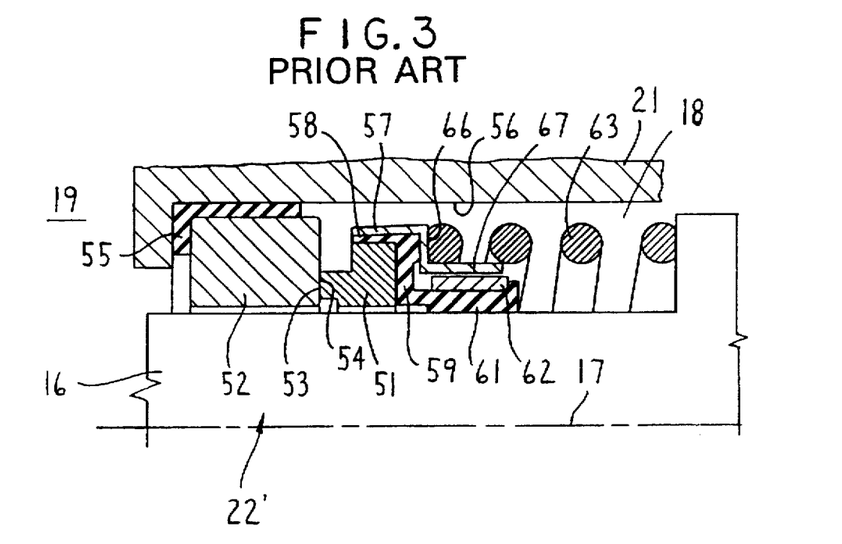
FIG. 3 is a view similar to FIG. 2 and illustrating another known mechanical seal assembly as used in this same environment.
Figure 3A:
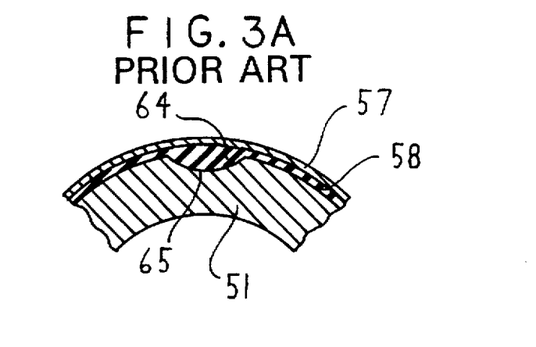
FIG. 3A is an enlarged fragmentary sectional view showing the drive connection with the rotating seal ring.

Another known mechanical seal as used in the aforementioned environment is illustrated by the seal designated 22' in FIGS. 3 and 3A. This mechanical seal 22' is of somewhat similar construction in that it includes annular seal rings 51 and 52 which generally concentrically surround the shaft 16 and respectively have opposed annular seal faces 53 and 54 which are defined on opposed axial ends thereof and are maintained in relatively rotating sealing contact with one another. The seal ring 52 is non-rotatable and for this purpose is non-rotatably supported within a surrounding elastomeric support ring 55, the latter being suitably secured by elastomeric compression within the stuffing box opening 56 defined by the housing 21. The other seal ring 51 is rotatable with the shaft 16, and for this purpose there is provided an annular drive sleeve 57 which exteriorly surrounds the outer annular surface of the sealing ring 51, with a suitable thin elastomeric sleeve 58 being defined therebetween. The drive sleeve 57 and face ring 51 are suitably non-rotatably joined together, and for this purpose the drive sleeve 57 as shown in FIG. 3A typically compressed two or more shallow inwardly projecting elastomeric ribs 64 which are axially elongated, and these ribs 64 in turn project into shallow axially elongated grooves 65 defined in the outer annular surface of the seal ring 51. Each rib 64 thus projects into one of the shallow recesses 65, and is part of the elastomeric sleeve 58 which is crimped between the ring 51 and sleeve 57. The elastomeric sleeve 58 is part of a sleeve-like flexible diaphragm or bellows 59 of elastomeric material, the latter projecting radially downwardly behind the seal ring 51 and then having an axially elongate sleeve part 61 which surrounds and is sealingly and non-rotatably engaged by elastomeric compression with the shaft 16, the latter being accomplished by a surrounding clamping ring 62. A coil spring 63 generally concentrically surrounds the shaft with one end of the spring being seated against a shoulder or surface defined on the shaft 16, and the other end of the spring 63 being abutted against an intermediate radially-projecting wall 66 formed integrally with the drive sleeve 57, the latter as shown in FIG. 3 being generally Z-shaped in cross-section so as to have a further annular sleeve part 67 which projects generally concentrically into the interior of the compressed spring 63. The ring 62 and sleeve part 67 having mating opposed hexagonal surfaces to effect a drive connection therebetween. This mechanical seal 22' operates in a generally similar manner to the seal 22 described above in that seal ring 51 not only rotates with the shaft but is also urged axially by the spring 63 to thereby maintain the seal faces 53 and 54 in relatively rotatable but sealing contact with one another to prevent or greatly minimize escape of fluid from the chamber 18 to the atmosphere 19.

In another known mechanical seal as used in the aforementioned environment, the seal is provided with a construction similar to that illustrated by FIGS. 3–3A except that the drive sleeve which surrounds the rotating seal ring is provided with a pair of ribs or tangs which project into enlarged depressions formed in the external surface of the seal ring, which depressions are oversized and hence do not provide for proper securement of the seal ring within the drive sleeve. Further, with this latter arrangement the drive sleeve has a reduced diameter drive hub similar to the sleeve 67 in FIG. 3, and this reduced diameter drive hub is drivingly joined to a sleeve surrounding the drive shaft through small tangs or ribs, which ribs have created a failure problem due to their inability to withstand the torque loading imposed on the seal assembly.

The known mechanical seals as described above have been extensively utilized for many years in diesel cooling system pumps of the general type described above, and in fact extremely large numbers of such seal assemblies have been so utilized. However, with the ever increasing demands for greater life and reliability, it has been discovered that these known seal assemblies do not possess the characteristics necessary to provide appropriate life and durability properties. For example, heavy duty truck owners are increasingly demanding that vehicle engines and accessories therefor provide long duty cycles, and are further demanding that the manufacturers warrant the engines and the accessories for such long duty cycles. At the present time, manufacturers are being required to warrant their engines and accessories for anywhere from 200,000 to 500,000 miles. It has been discovered, however, that the prior mechanical seal assemblies of the type depicted by FIGS. 2 and 3 are incapable of operating satisfactorily for such long duty cycles, and in fact it has been observed that both of these arrangements often experience failures at life cycles far short of those currently demanded by users, and it has been still further observed that many of these failures are due to an inability to maintain a proper driving engagement with the axially-movable seal ring. For example, a rather significant incidence of failures have been observed due to the type of driving connection provided between the sleeve part 35 and the axially movable seal ring 23 in FIG. 2, and due to bellows failures in the arrangement of FIG. 3.

It is thus an object of this invention to provide an improved mechanical seal assembly which is particularly desirable for use in a coolant circulation system of a heavy duty vehicle, as aforesaid, which improved mechanical seal assembly can provide significantly increased durability and life so as to permit more reliable performance over a much longer duty cycle, and yet at the same time still be relatively inexpensive to manufacture and of small and compact size.

To achieve the objectives of the present invention, there is provided an improved mechanical seal assembly which includes relatively rotatable annular seal rings disposed in surrounding relationship to the pump drive shaft, with one seal ring being non-rotatable with respect to the drive shaft and the other non-rotatable with respect to the surrounding housing. These seal rings have opposed annular seal faces maintained in relatively rotatable contacting relationship due to the urging of a spring which acts against the non-rotating seal ring, the latter in turn being axially movably supported on a lightweight and compact mounting member which stationarily seats within the opening or stuffing box of the housing. The mounting member has a sleeve part which externally surrounds a radially projecting flange provided on the non-rotatable seal ring, which sleeve part has a large opening provided with a plurality of circumferentially elongate flats defined circumferentially therearound, preferably a hexagonal wall defining said opening, and the flange of the seal ring similarly has a mating contour, such as a hexagonal contour, so that the non-rotating seal ring is axially slidably supported within the sleeve part of the mounting member but at the same time a very large and durable non-rotatable contact region is defined between the non-rotating sealing ring and the mounting member to thereby provide a compact yet very strong and durable structure so as to permit the seal to possess long life.

In the mechanical seal of the present invention, and specifically in a preferred embodiment thereof, the mounting member is formed of two sleeve-like annular rings each preferably formed by being stamped or die-formed from thin metal sheets, with these two sleeve parts being axially joined through an interlocking annular flange arrangement to thereby define a housing which effectively confines therein not only the non-rotating seal ring but also an elastomeric sealing bellows and a spring, the resulting assembly permitting ease of assembly and handling due to its effectively forming a compact cartridge which can be readily assembled within the stuffing box in surrounding relationship to the shaft.

Other objects and purposes of the invention will be apparent to persons familiar with constructions of this general type upon reading the following specification and inspecting the accompanying drawings.

Certain terminology will be used in the following description for convenience and reference only, and will not be limiting. For example, the words "upwardly", "downwardly", "rightwardly" and "leftwardly" will refer to directions in the drawings to which reference is made.

The words "inward" and "outward" will refer to directions toward and away from, respectively, the geometric center of the assembly and designated parts thereof. Said terminology will include the words specifically mentioned, derivatives thereof, and words of similar import.

DETAILED DESCRIPTION

Figure 4:
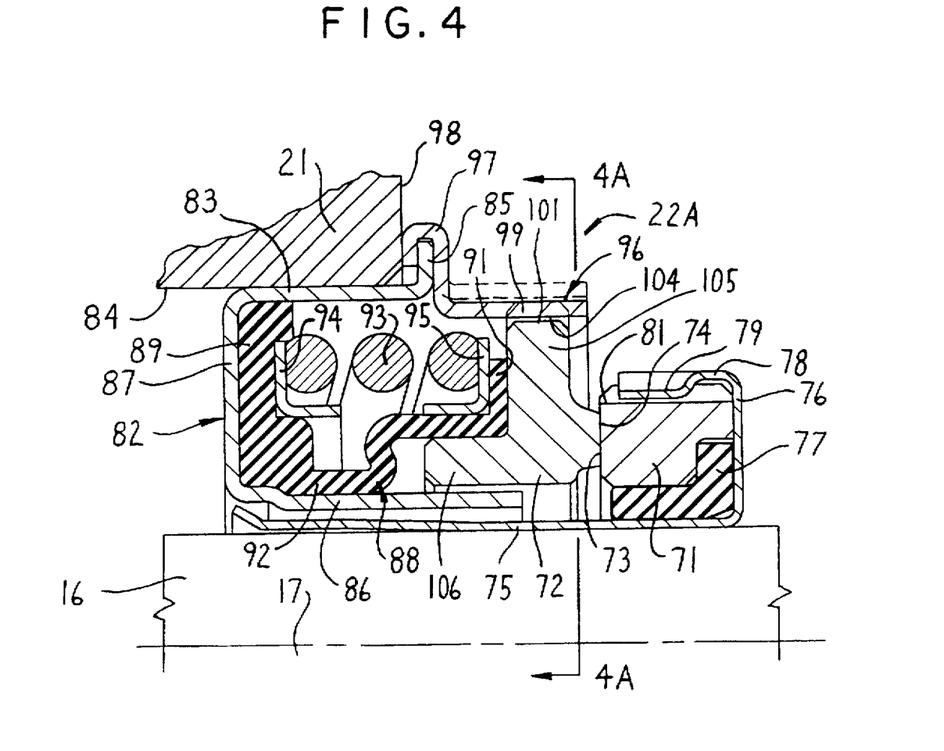
FIG. 4 is a sectional view similar to FIG. 2 but illustrating therein the improved mechanical seal assembly of the present invention.
Figure 4A:
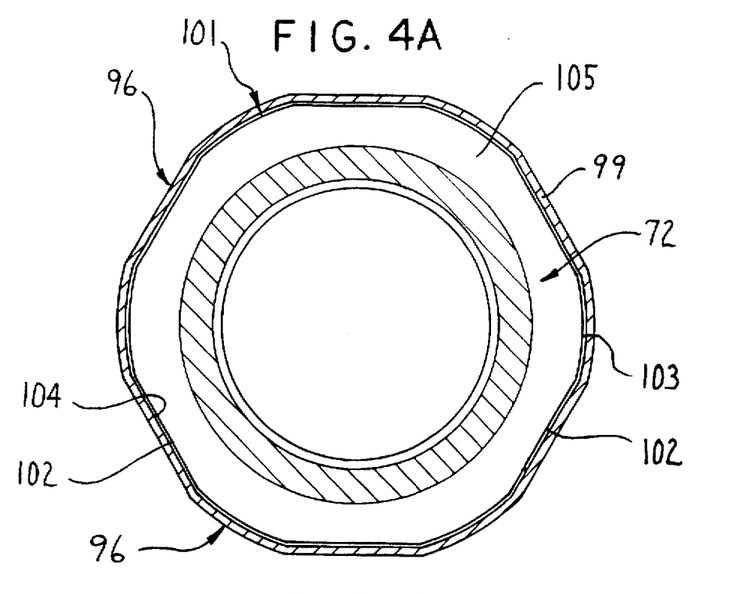
FIG. 4A is a sectional view taken generally along line 4A—4A in FIG. 4.

Referring to FIGS. 4 and 4A, there is illustrated an improved mechanical seal assembly 22A which is particularly desirable for use as a replacement for the seal assembly 22 of FIG. 1.

The seal assembly 22A includes annular seal rings 71 and 72 which are disposed generally concentrically in surrounding relationship to the shaft 16, and these seal rings have respective annular and generally flat seal faces 73 and 74 formed on the opposed axial ends thereof, which seal faces are normally maintained in relatively rotatable sealing contact with one another. The seal rings, as is conventional, are typically constructed of a hard and brittle material such as carbon or tungsten carbide.

The seal ring 71 is the rotating ring, and for this purpose it is supported on an elastomeric support ring 77 which in turn is seated on a cup-shaped drive part 76, which part 76 in the illustrated embodiment is fixedly, here integrally, joined to the outer end of an elongate shaft sleeve 75 which concentrically and non-rotatably surrounds the shaft 16.

The drive part 76 has an annular outer wall 78 which exteriorly surrounds the seal ring 71, and a plurality of axially elongate dimples or ribs 79 are formed in this wall 78. The ribs 79 in turn project into axially elongate grooves 81 formed in the outer wall of the seal ring 71 to non-rotatably and drivingly interconnect the ring 71 with respect to the shaft 16 and shaft sleeve 75.

The other seal ring 72 is non-rotatably but axially movably supported with respect to the housing 21, and for this purpose there is provided an annular mounting member 82 which encircles the shaft 16 and has an outer annular wall 83 which is stationarily seated within the stuffing box opening 84. This outer annular wall 83 at its outer or forward end terminates in a radially outwardly projecting annular flange 85.

The mounting member 82 also has an inner annular wall 86 which is positioned closely adjacent but slightly spaced from the shaft sleeve 75 so as to be free of contact therewith. The outer and inner annular walls 83 and 86 are in turn rigidly and here integrally joined together by a rear wall 87 which extends generally radially therebetween. The walls 83, 86 and 87 hence define a generally channel-shaped cross-section which opens axially outwardly of the stuffing box toward the rotating seal ring 71.

The housing for the seal ring 72 also includes a securing sleeve 96 which is disposed in surrounding relationship to the shaft 16 in coaxial alignment with the mounting member 82, and at its rearward axial end includes a radially outwardly projecting annular flange 97 which is of a generally U-shaped cross-section so that one leg of the flange abuts the front face 98 of the housing 21. The edge flange 85 of the rear mounting member 82 projects into the U-shaped edge flange 97 so as to permit axial and fixed securement of the mounting member 82 and securing sleeve 96 together to thereby define a housing for the seal ring 71. The flange 85 in the preferred embodiment is fixedly crimped within the U-shaped flange 97, although other securement means such as spot welding can be utilized. The seal ring 71 is sealed relative to the housing by an annular membrane or bellows 88 which also surrounds the shaft and is effectively confined within the annular mounting member 82. The membrane 88, as is typical, is constructed of a elastomeric material and, in radial cross-section, is generally U or channel shaped in that it includes a radially projecting rear wall 89 which sealingly engages the rear wall 87 of the mounting member. The membrane also includes a radially projecting front wall 91 which engages a radial rear surface of the seal ring 72. These walls 89 and 91 of the membrane 88 are in turn joined by a flexible but elongate sleeve part 92 which effectively surrounds the inner annular housing wall 86. A coiled compression spring 93 is positioned within the mounting member 82 in surrounding relationship to the membrane sleeve part 92, with opposite ends of the spring 93 bearing against generally L-shaped support washers or ferrules 94 and 95, the latter in turn being seated against the membrane walls 89 and 91, respectively.

To effect a non-rotatable but axial slidable movement of the seal ring 72 within the housing, the axially-elongate annular sleeve part 99 of the securing sleeve 96 is provided with an enlarged axial opening 104 which opens outwardly through the free end of the housing, this opening 104 being generally of hexagonal shape. The seal ring 72 in turn has an enlarged radially outwardly projecting annular flange 105 which has an outer peripheral surface 101 which is also preferably of hexagonal configuration, the latter being sized so as to be closely accommodated within the hexagonal opening 104 to effect a non-rotatable but axial slidable connection between the securing sleeve 96 and the seal ring 72. The hexagonal outer surface 101 of the seal ring, as well as the surrounding hexagonal wall 104, are each defined by a plurality of circumferentially extending flats 102, with each pair of circumferentially adjacent flats preferably being joined through a small rounded surface 103.

The seal ring 72, as illustrated by FIG. 4, has a generally L-shaped cross-section which includes the rather large radially-outwardly projecting annular flange 105 which projects outwardly a significant distance beyond the seal face 74, and also includes an annular sleeve part 106 which projects axially rearwardly a substantial distance away from the radial flange 105, which sleeve part 106 defines the inner diameter of the seal ring 72. With this arrangement, the centroid of the seal ring 72 is disposed generally in axial alignment with the radial center of the seal face 74 so as to minimize twisting or distortion of the seal ring 72 when loaded, and at the same time provides the face ring 72 with a significant surface area, as defined on the flange 105, which is exposed to the cooler surrounding environment so as to assist in cooling of the face ring.

With the generally L-shaped cross-section of the seal ring 72 as described above, the outer peripheral surface 101 of the flange 105 is preferably spaced radially outwardly from the inner diameter of the ring 72 by a radial distance which is preferably at least about twice as great as the radial width of the seal face 74, which seal face is positioned more closely adjacent the inner diameter so that the flange 105 thus projects outwardly a significant radial extent beyond the seal face 74 to thus define a large surface area for assisting in cooling of the sealing ring while also resulting in the surface 101, this being the torque transfer or securing surface, being spaced radially a significant distance from the shaft axis 17 to thereby minimize the force and stress imposed on the surface 101. Stated somewhat differently, the sealing face 74 as associated with the sealing ring 72 will preferably have an outer diameter which is no greater than the mathematical average of the inner and outer diameters of the sealing ring 72, these inner and outer diameters being respectfully the maximum diameter of the outer surface 101 and the inner diameter as defined on the rear flange portion 106.

The housing for the seal and specifically for the sealing ring 72, as defined by the mounting member 82 and securing sleeve 96, effectively defines a cartridge which is effective for retaining the seal ring 72 as well as the membrane 88 and spring 93 as a unitized arrangement, with this cartridge in turn being effectively retained on the shaft sleeve 75 so that the entire seal assembly constitutes a cartridge which facilitates handling and assembly on the shaft.

The housing as defined by the mounting member 82 and sleeve part 96 is defined by preferably forming each of the members 82 and 96 from thin metal, preferably stainless steel, and preferably forming these members by stamping so as to permit economical construction of a lightweight but durable housing.

The hexagonal drive connection between the seal ring 72 and the housing sleeve part 99 also provides a significantly increased contact area to thereby provide a secure non-rotatable but axial slidable connection with the seal ring 72, which hexagonal drive connection is provided on a large outer diameter associated with the seal ring 72 to thereby greatly minimize stress both due to the diameter of the hexagonal surface but also due to the significant contact area which exists between the seal ring and the surrounding sleeve part. At the same time this significant diameter as provided by the seal ring 72, and the significant radial flange 105 associated therewith, all greatly facilitate the transfer of heat and hence cooling of the seal ring.

Figure 5:
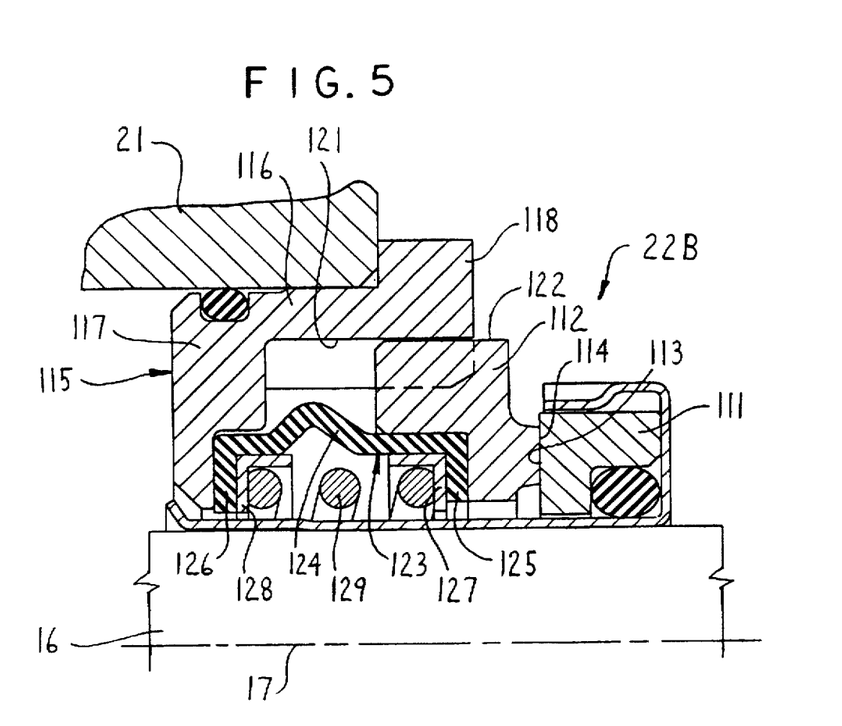
FIG. 5 is a central sectional view similar to FIG. 4 but illustrating a further embodiment of a mechanical seal according to the present invention.

Referring now to FIG. 5, there is illustrated an alternate embodiment of a mechanical seal assembly 22B according to the present invention. In this embodiment, the seal rings 111 and 112 have respective opposed seal faces 113 and 114 formed on the opposed axial ends thereof and normally maintained in relatively rotatable sealing contact with one another. The seal ring 111 is non-rotatably mounted on the shaft in generally the same manner as illustrated in FIG. 4 and as described above.

As to the non-rotatable seal ring 112, it is non-rotatably but axially slidably mounted within a one-piece mounting member 115 which is generally cup-shaped and includes an annular side wall 116 which is stationarily and sealingly engaged within the stuffing box opening of the housing 21. The annular side wall 116 is joined to a radially extending base wall 117 and these latter walls cooperate to define therein an opening or chamber 121 which opens axially outwardly. The mounting member also has an annular front flange 118 which projects radially outwardly so as to overlap the front wall of the housing 21.

The sealing ring 112 is axially slidably but non-rotatably positioned within the opening 121, and for this purpose the seal ring 112 has an outer peripheral wall 122 which preferably has a hexagonal configuration, and the opening 121 similarly has a hexagonal configuration so that the sealing ring 112 is thus non-rotatably but closely confined so as to permit axial slidable displacement of the sealing ring 112.

An elastomeric bellows-type diaphragm 123 is sealingly joined between the seal ring 112 and the mounting member 115. This diaphragm has an elongate flexible sleeve part 124 which is positioned within the opening or chamber 121, and the center sleeve part 124 is joined to L-shaped end parts 125 and 126 which are respectively sealingly engaged with the seal ring 112 and the rear wall 117. These membrane end parts 125 and 126 in turn have suitable L-shaped bearing washers or ferrules 127 and 128 respectively seated thereon, and these ferrules in turn support opposite ends of a compressed coil spring 129.

With this arrangement, the membrane surrounds the spring, and the spring axially urges the non-rotatable sealing ring 112 outwardly so as to maintain the seal face 114 thereof in contact with the opposed rotatable seal face 113 defined on the rotatable seal ring 111.

Due to the provision of the large-diameter hex-shaped exterior surface 122 on the seal ring 112, and its axial slidable engagement within the opposed hexagonal-shaped opening 121 formed in the mounting member 115, there is again provided a very secure drive connection between the housing 115 and the axially-slidable seal ring 112 so as to provide a large surface area which maximizes surface contact area and hence minimizes stress, and also minimizes force due to the large torque arm created by the large diameter surface.

Although particular preferred embodiments of the invention have been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a recirculating coolant system for a diesel engine, said system including recirculating pump means having a pump casing defining a fluid chamber therein and a rotary pumping member disposed in said chamber and supported on a rotatable shaft which is rotatable about its longitudinal axis and which projects outwardly of said casing through a stationary sleeve-like casing part which substantially concentrically surrounds said shaft, and a contacting face-type mechanical seal assembly concentrically interposed between said shaft and said casing part to seal said fluid chamber from the surrounding environment, the improvement wherein said mechanical seal assembly comprises:

first and second seal rings disposed in axially adjacent and surrounding relationship to said shaft and respectively defining thereon first and second annular axially-opposed seal faces which are normally maintained in relatively rotatable contacting engagement to create a seal radially thereacross;

first mounting means connected between said shaft and said first ring for non-rotatably mounting said first seal ring with respect to said shaft;

second mounting means connected between said casing part and said second seal ring for non-rotatably mounting said second seal ring on said casing part;

said second mounting means including an annular mounting member disposed in generally concentrical relationship to said shaft and being stationarily seated generally concentrically within said sleeve-like casing part, said mounting member having a generally cup-like configuration including an outer sleeve-like annular wall which is seated within said casing part and which in turn joins to a radially inwardly projecting base wall which surrounds said shaft, said outer wall including at least an axially elongate sleeve part thereof which is formed of a rigid metal, said sleeve part being provided with an interior coaxially-aligned opening of generally hexagonal configuration defined by an inner hexagonal wall defined on said sleeve part, said inner hexagonal wall having a plurality of circumferentially-extending inner surface sections which are serially joined together so as to define said hexagonal configuration, said second sealing ring being positioned within said sleeve part in axially spaced relation from said base wall, said second seal ring having an annular flange which projects radially outwardly from said second seal face and which has a surrounding external surface of generally hexagonal configuration defined by a plurality of circumferentially-extending ring surface sections which are serially joined together, said hexagonal configuration of said second seal ring corresponding to said hexagonal configuration of said inner hexagonal wall such that each of said inner surface sections faces toward an opposing one of said ring surface sections, said inner surface sections including a plurality of circumferentially elongate first flats which are serially joined together circumferentially around said inner hexagonal wall, said ring surface sections including a plurality of circumferentially elongate second flats which are serially joined together circumferentially around said external surface, each of said first flats being disposed in opposing contacting relation with a respective one of said second flats and having a circumferential length which is substantially the same as the circumferential length of the opposing second flat to define a contact area therebetween which extends circumferentially along substantially the entire circumferential lengths of said opposing first and second flats, a plurality of said contact areas being defined about said second seal ring wherein said contact areas extend circumferentially along a majority of the outer diameter of said external surface, said surrounding external surface being non-rotatably but axially slidably engaged with the inner hexagonal wall of said sleeve part;

a spring positioned in surrounding relationship to said shaft within said annular outer wall and having opposite ends thereof cooperating between said second seal ring and said base wall for axially urging said second seal ring axially toward said first seal ring; and an axially elongate, elastomeric flexible membrane positioned in surrounding relationship to said shaft and having one end thereof sealingly engaged with said second seal ring and the other end thereof sealingly engaged with said base wall.

2. A system according to claim 1, wherein said mounting member includes a cup-shaped mounting element which is seated within said sleeve-like casing part and includes said base wall and said surrounding outer wall, said outer wall terminating in an annular flange which projects radially outwardly and overlaps an end wall on said casing part, said mounting member also including a sleeve element which is fixed to said mounting element and effectively constitutes an axial extension of said outer wall, said sleeve element having an axially elongate sleeve part which defines therein said inner hexagonal wall, said sleeve part terminating at its inner end in an outwardly projecting annular flange which effectively abuts and is fixedly secured to the annular flange on said mounting element.

3. The system of claim 2, wherein the flange on said sleeve element is generally U-shaped in cross-section, and the flange on said mounting element projects into and is sandwiched within the U-shaped flange on said sleeve element, said flanges being fixedly crimped together.

4. A system according to claim 3, wherein said spring outwardly circumferentially surrounds said membrane.

5. A system according to claim 2, wherein said mounting element and said sleeve element are each stamped from thin sheetlike metal.

6. A system according to claim 2, wherein said second seal ring is generally L-shaped in axial cross-section and includes a first axially elongate leg part which defines the inner diameter of said second seal ring and which projects axially rearwardly in general alignment away from said second seal face, and a second leg which projects radially outwardly from said first leg at an end thereof in the vicinity of said second seal face, said second leg projecting outwardly through an extent so as to terminate in said external surface, said external surface being spaced radially outwardly from said inner diameter by a distance which is at least about twice as great as the radial width of said second seal face so that said second leg defines a surrounding annular flange of significant surface area to assist in cooling of said second seal ring.

7. A mechanical seal assembly for sealing a coolant circulating pump of a diesel engine, said mechanical seal assembly being generally concentrically disposed between a shaft which rotates about its axis and a surrounding sleeve-like housing which is fixedly associated with a housing of the pump, comprising:

first and second sealing rings disposed in axially adjacent and surrounding relationship to said shaft, said first and second sealing rings defining thereon respective axially-opposed first and second sealing faces which are normally maintained in relatively rotatable contacting engagement with one another, said first sealing face having an outer diameter which is no larger than the average of the inner and outer diameters of the first sealing ring;

a mounting structure for supporting said first sealing ring in non-rotatable but axially slidable relation relative to said housing, said mounting structure including a generally cup-shaped annular member which includes a generally axially-elongated sleeve-like outer wall joined at an axially inner end thereof to a radially projecting base wall which has a central opening therethrough for accommodating said shaft therein, said outer wall being stationarily seated within an interior annular wall defined by said surrounding housing, said annular wall having a radially outwardly projecting annular flange which overlaps an end surface on said housing;

said outer wall defining thereon an inner annular surface which is axially elongated and which is defined by a plurality of circumferentially elongated flats which extend generally around said surface and are substantially circumferentially serially joined together so that said inner annular surface has a generally polygonal configuration, each of said flats being serially joined to a circumferentially adjacent flat by an intermediate surface section which extends circumferentially therebetween, each of said surface sections having a circumferential length which is smaller than the circumferential length of each of said flats;

said first sealing ring having a central opening therethrough defined by said inner diameter which is greater than the diameter of said shaft so that said inner diameter of said first sealing ring is free of contact with the rotatable shaft, said first sealing ring having an outer annular surface defining said outer diameter which is axially elongated and which in a circumferentially extending direction is defined by a plurality of circumferentially elongated flats which are substantially serially joined together circumferentially around the second sealing ring so that the outer surface has a polygonal cross-section which substantially corresponds to but is only slightly smaller than the polygonal annular inner wall so that said second sealing ring is non-rotatably but axially slidably supported on said inner annular wall, each of said flats of said outer annular surface being serially joined to a circumferentially adjacent one of said flats by an intermediate surface section which extends circumferentially therebetween, each of said surface sections of said outer annular surface having a circumferential length which is smaller than the circumferential length of each of said flats, each of said flats and said surface sections of said inner annular surface being disposed in opposing and contacting relation with a respective one of said flats and said surface sections of said outer annular surface, each opposing pair of said flats defining a contact area therebetween which extends along substantially the entire circumferential lengths of said opposing flats to prevent rotation of said first seal ring;

spring means positioned within said outer annular wall in surrounding relationship to said shaft and having opposite ends thereof cooperating with said base wall and a rear side of said first sealing ring for normally urging said first sealing ring axially away from said base wall toward a position of contact with said second sealing ring; and means for non-rotatably mounting said second sealing ring on said shaft.

8. A mechanical seal assembly according to claim 7, wherein said annular member is defined by two annular sleeve-like elements which are axially joined together and surround said shaft and are fixed to said housing, said first element being defined by said outer annular wall and said base wall as well as by an inner annular wall which joins to said base wall and projects axially therefrom in generally parallel but radially spaced relation from said outer annular wall so as to define an annular chamber therebetween which opens axially toward said second sealing ring, said outer annular wall at its outer free edge being provided with said annular flange projecting outwardly therefrom so as to overlap the end surface of said housing, said second element being defined by an axially elongate annular sleeve part which at an axially inner end thereof terminates in a radially outwardly projecting annular flange which in axial cross-section is radially-inwardly channel shaped, said annular flange on said first element projecting radially into the channel-shaped flange on said second element and being fixedly secured thereto, said sleeve part of said second element being of outer diameter similar to said outer annular wall of said first element, said sleeve part also throughout the axial extent thereof being of generally uniform wall thickness and circumferentially contoured so as to define a generally tubular construction of polygonal cross-section having an inner polygonal wall which non-rotatably but axially slidably engages the outer polygonal wall of said first sealing ring.

* * * * *